United States Patent
Cho et al.

(10) Patent No.: US 8,649,345 B2
(45) Date of Patent: Feb. 11, 2014

(54) METHOD FOR ALLOCATING RESOURCES FOR TRANSMISSION OF BANDWIDTH REQUEST INFORMATION AND METHOD FOR TRANSMITTING THE BANDWIDTH REQUEST INFORMATION IN A WIRELESS COMMUNICATION SYSTEM

(75) Inventors: Hee Jeong Cho, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 231 days.

(21) Appl. No.: 13/142,844

(22) PCT Filed: Dec. 18, 2009

(86) PCT No.: PCT/KR2009/007606
§ 371 (c)(1),
(2), (4) Date: Jun. 29, 2011

(87) PCT Pub. No.: WO2010/079902
PCT Pub. Date: Jul. 15, 2010

(65) Prior Publication Data
US 2011/0274069 A1    Nov. 10, 2011

Related U.S. Application Data

(60) Provisional application No. 61/142,884, filed on Jan. 6, 2009.

(30) Foreign Application Priority Data

Mar. 18, 2009    (KR) ........................ 10-2009-0023005

(51) Int. Cl.
*H04W 4/00*    (2009.01)
(52) U.S. Cl.
USPC ....... 370/329; 370/342; 370/348; 370/395.21

(58) Field of Classification Search
USPC ............. 370/329, 335, 348, 342, 395.21, 470
See application file for complete search history.

(56) References Cited

U.S. PATENT DOCUMENTS

| | | | |
|---|---|---|---|
| 2006/0239241 A1* | 10/2006 | Eom et al. | 370/348 |
| 2007/0104177 A1* | 5/2007 | Hwang et al. | 370/348 |
| 2008/0139216 A1 | 6/2008 | Lee et al. | |
| 2008/0232330 A1 | 9/2008 | Lee et al. | |
| 2010/0008331 A1* | 1/2010 | Li et al. | 370/335 |

FOREIGN PATENT DOCUMENTS

| | | |
|---|---|---|
| CN | 101155093 | 4/2008 |
| JP | 2006-196985 | 7/2006 |
| JP | 2008-245138 | 10/2008 |
| JP | 2008-245141 | 10/2008 |
| JP | 2010-515374 | 5/2010 |
| KR | 10-0838534 | 6/2008 |
| WO | 2008/082908 | 7/2008 |
| WO | 2008/093424 | 8/2008 |
| WO | 2008/107625 | 9/2008 |

OTHER PUBLICATIONS

The State Intellectual Property Office of the People's Republic of China Application Serial No. 200980153918.7, Office Action dated May 24, 2013, 6 pages.

* cited by examiner

*Primary Examiner* — Jeffrey M Rutkowski
*Assistant Examiner* — Harun Chowdhury
(74) *Attorney, Agent, or Firm* — Lee, Hong, Degerman, Kang & Waimey (57) ABSTRACT

A method for allocating resources for transmission of Bandwidth Request (BR) information and a method for transmitting the BR information in a wireless communication system are disclosed. The BR information transmission method includes transmitting a BR code in a first region of a subframe to a Base Station (BS) to attempt a random access, and transmitting BR information in a second region of the subframe to the BS to request resource allocation.

8 Claims, 11 Drawing Sheets

METHOD FOR ALLOCATING RESOURCES FOR TRANSMISSION OF BANDWIDTH REQUEST INFORMATION AND METHOD FOR TRANSMITTING THE BANDWIDTH REQUEST INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2009/007606, filed on Dec. 18, 2009, which claims the benefit of earlier filing date and right of priority to Korean Application No. 10-2009-0023005, filed on Mar. 18, 2009, and also claims the benefit of U.S. Provisional Application Ser. No. 61/142,884, filed on Jan. 6, 2009, the contents of which are all incorporated by reference herein in their entirety.

TECHNICAL FIELD

The present invention relates to a wireless communication system, and more particularly, to a method for allocating resources in which bandwidth request information is to be transmitted and a method for transmitting the bandwidth request information in a wireless communication system.

BACKGROUND ART

Figure 1:
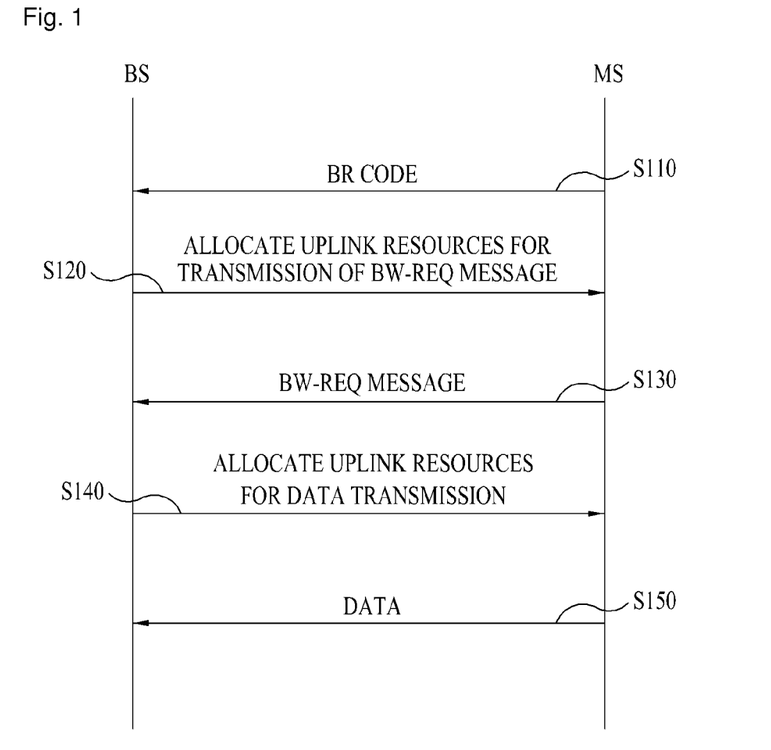
FIG. 1 illustrates a conventional resource allocation procedure in a wireless communication system.

FIG. 1 illustrates a conventional resource allocation procedure in a wireless communication system.

Referring to FIG. 1, a Mobile Station (MS) requests an uplink bandwidth by random access in the conventional wireless communication system. The MS transmits a Bandwidth Request (BR) code to a Base Station (BS) in step S110.

Upon receipt of the BR code, the BS allocates uplink resources to the MS so that the MS may transmit a BandWidth Request (BW-REQ) message in the uplink resources in step S120.

After transmitting the BR code, the MS activates a timer. If uplink resources for transmission of a BW-REQ message are not allocated to the MS until expiration of the timer, the MS retransmits the BR code to the BS. The timer may be set to a contention-based reservation timeout value.

In step S130, the MS transmits the BW-REQ message to the BS in the allocated uplink resources. Upon receipt of the BW-REQ message from the MS, the BS allocates uplink resources to the MS, for uplink data transmission in step S140. The MS transmits data in the allocated uplink resources in step S150. In this manner, the resource allocation is a five-step procedure in the conventional communication system.

Figure 2:
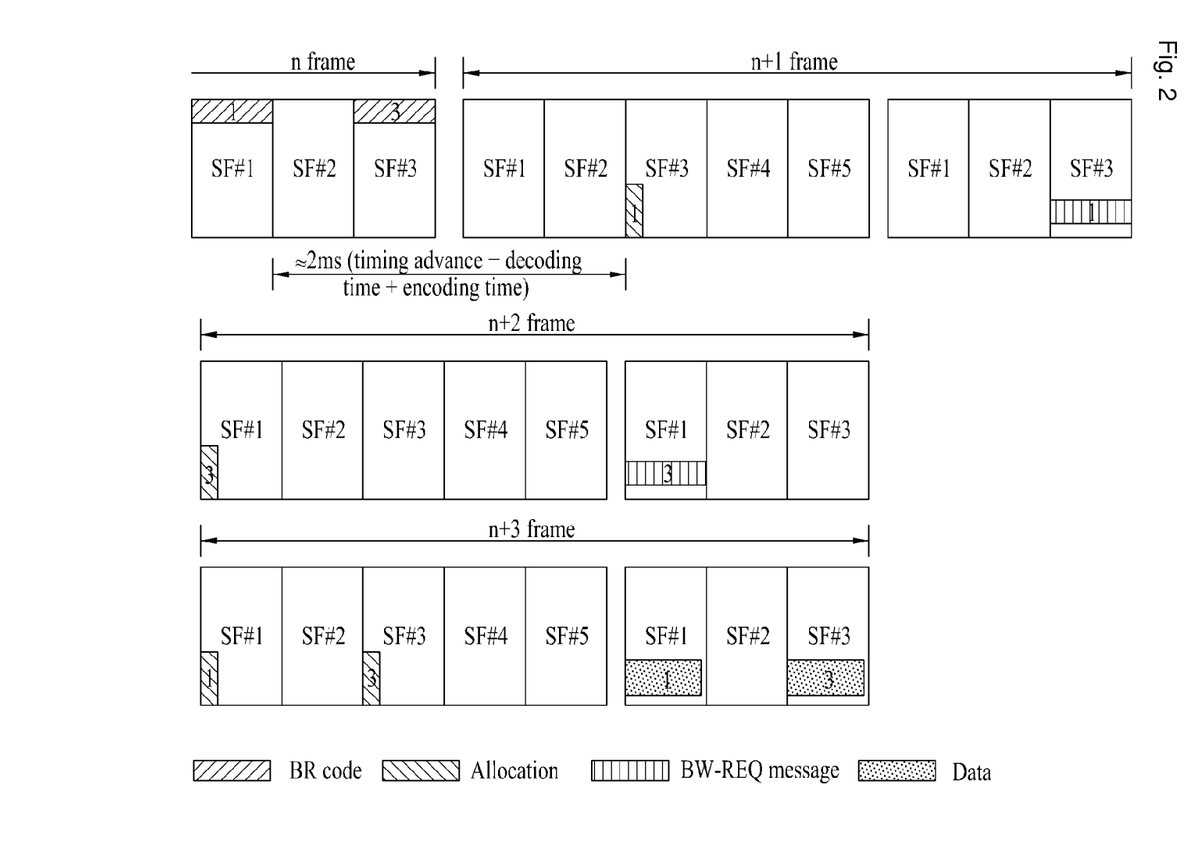
FIG. 2 is a diagram illustrating transmission timings of signaling and messages during the conventional resource allocation procedure in the wireless communication system.

FIG. 2 is a diagram illustrating transmission timings of signaling and messages during the conventional resource allocation procedure in the wireless communication system.

Referring to FIG. 2, one frame includes five downlink subframes and three uplink subframes. Reference numeral 1 denotes transmission time points of signaling and messages, when a BR code is transmitted in a first uplink subframe, and reference numeral 3 denotes transmission time points of signaling and messages, when a BR code is transmitted in a third uplink subframe.

Uplink data is transmitted in the third frame after transmission of a BR code. Given a 5-ms frame, 15 ms is taken to transmit uplink data after a BR code is transmitted. A possible failure in contention resolution and transmission adds to the time delay.

DISCLOSURE OF INVENTION

Technical Problem

As described above, the conventional resource allocation method has limitations in satisfying a Quality of Service (QoS) requirement of delay-sensitive traffic due to a long time delay.

An object of the present invention devised to solve the problem lies on a resource allocation method for satisfying a QoS requirement by reducing a time delay.

Another object of the present invention devised to solve the problem lies on a resource allocation method for enabling efficient utilization of uplink resources.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The object of the present invention can be achieved by providing a method for transmitting BR information in an MS in a multi-carrier wireless communication system, including transmitting a BR code in a first region of a subframe to a BS to attempt a random access, and transmitting BR information in a second region of the subframe to the BS to request resource allocation.

In another aspect of the present invention, provided herein is a method for allocating resources for transmission of BR information in a BS in a multi-carrier wireless communication system, including receiving a BR code for a random access in a first region of a subframe from an MS, receiving BR information requesting resource allocation in a second region of the subframe from the MS, and allocating uplink resources for data transmission to the MS.

The BR code may be a code selected by the MS among a plurality of predetermined codes.

The BR code may be a code allocated to the MS by the BS.

The second region may be allocated to the MS by the BS.

The second region may be determined according to the BR code.

Advantageous Effects of Invention

Embodiments of the present invention have the following effects.

Due to a simplified resource allocation procedure, a time delay is reduced and the QoS of delay-sensitive traffic is improved.

BR information regions are flexibly determined. Therefore, uplink resources are efficiently utilized.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts.

Through the specification, when it is said that some part "includes" a specific element, this means that the part may further include other elements, not excluding them, unless otherwise mentioned. The term "-er(or)", "module", "portion" or "part" is used to signify a unit of performing at least one function or operation. The unit can be realized in hardware, software, or in combination of both.

Methods for transmitting Bandwidth Request (BR) information according to embodiments of the present invention will be described below with reference to FIGS. 3 to 14.

Figure 3:
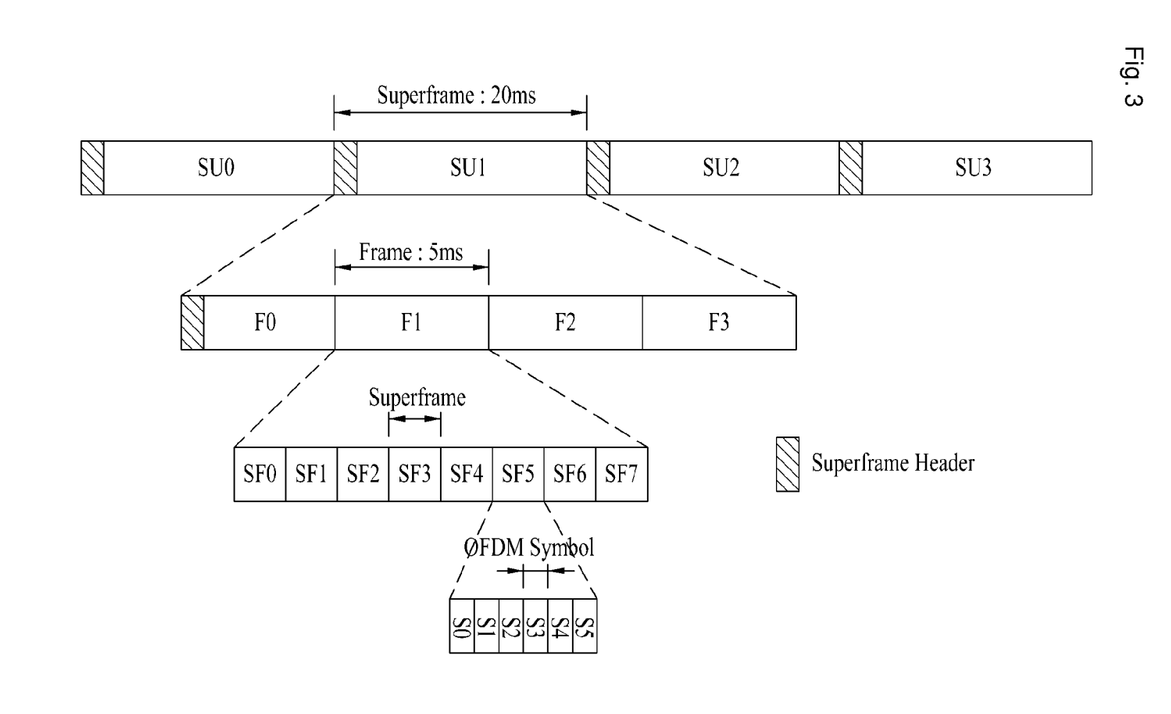
FIG. 3 illustrates a frame structure in a wireless communication system according to an embodiment of the present invention.

With reference to FIG. 3, a description will first be made of a frame structure in a wireless communication system according to an embodiment of the present invention.

FIG. 3 illustrates a frame structure in a wireless communication system according to an embodiment of the present invention.

Referring to FIG. 3, a superframe includes four frames, starting with a SuperFrame Header (SFH). Each frame includes eight subframes. The number of downlink subframes and the number of uplink subframes depend on a downlink-to-uplink ratio. In this embodiment, the first five subframes are used for downlink transmission and the other three subframes are used for uplink transmission in a subframe.

A subframe includes a plurality of subcarriers in frequency by a plurality of Orthogonal Frequency Division Multiplexing (OFDM) symbols in time. The number of OFDM symbols in the subframe may be 5, 6 or 7 depending on the length of a Cyclic Prefix (CP) in the time domain.

In a multi-carrier wireless communication system, radio resources are a set of contiguous subcarriers. A rectangular time-resource area defined by symbols in time and by subcarriers in frequency is called a Resource Unit (RU). Accordingly, a subframe includes a plurality of RUs.

An uplink subframe may include a control information region and a BR information region. The control information region is a resource area in which a Mobile Station (MS) transmits control information needed for establishing and maintaining a connection between the MS and a Base Station (BS) to the BS. The BR information region is a resource area used for the MS to transmit BR information to the BS. The positions and number of BR information regions are signaled to the MS in an SFH or Advanced MAP (A-MAP) by the BS or unicast to the MS in a Medium Access Control (MAC) message by the BS during ranging.

Figure 4:
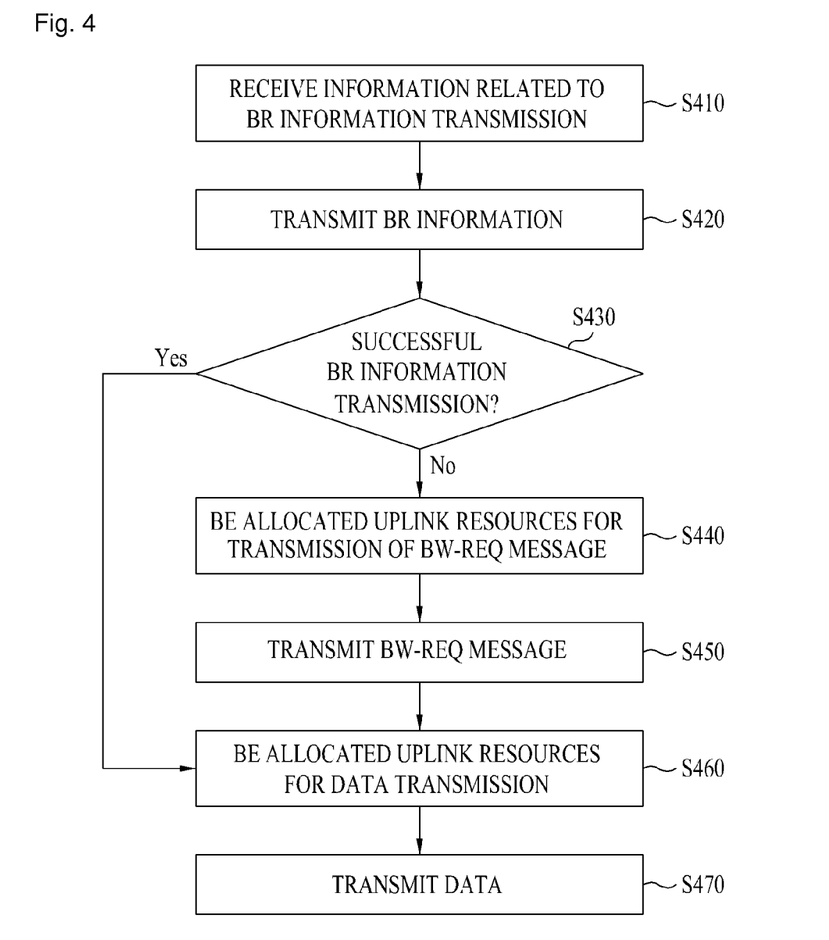
FIG. 4 is a flowchart illustrating a method for transmitting Bandwidth Request (BR) information in a Mobile Station (MS) in the wireless communication system according to an embodiment of the present invention.

FIG. 4 is a flowchart illustrating a method for transmitting BR information in an MS in the wireless communication system according to an embodiment of the present invention.

Referring to FIG. 4, the MS receives BR information transmission-related information from a BS in step S410. The BR information transmission-related information specifies the positions of BR information regions, resources allocated to the BR information regions, the total number of BR information regions, and a mapping rule between BR codes and BR information regions. The BR information transmission-related information is signaled to the MS in an SFH carrying system information or an A-MAP carrying information for a specific MS. Alternatively or additionally, the BR information transmission-related information is unicast to the MS in a MAC message during ranging.

Figure 5:
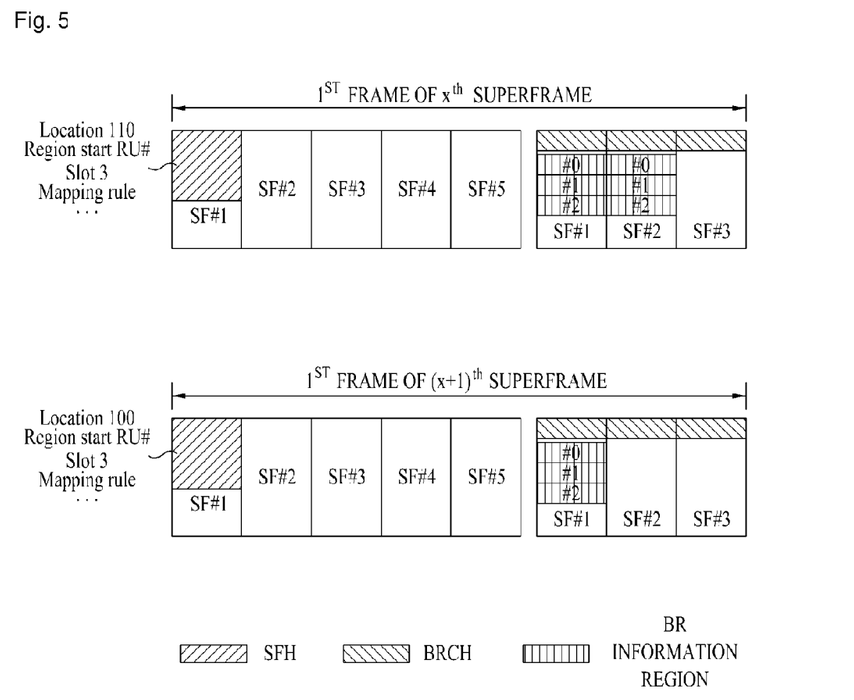
FIG. 5 illustrates frame structures in the case where BR information transmission-related information is transmitted in a SuperFrame Header (SFH).

FIG. 5 illustrates frame structures in the case where BR information transmission-related information is transmitted in an SFH.

Referring to FIG. 5, the SFH resides in the first downlink subframe of a superframe, including Location, Region, Slot, and Mapping rule fields.

The Location field indicates subframes having BR information regions. While the Location field is represented as a bitmap to indicate the subframes having BR information regions in FIG. 5, it may be set to a value indicating the subframes having BR information regions. Also, the Location field may indicate the starting one and number of the subframes having BR information regions. If the starting subframe is preset, only the number of the subframes having BR information regions is set.

In the illustrated case of FIG. 5, the Location field is set to 110 in an xth superframe, which implies that BR information regions are defined in the first and second of three uplink subframes in each of four frames. In an (x+1)th superframe, the Location field is set to 100. Hence, BR information regions are present in the first of three uplink subframes.

The Region field indicates the index of the starting RU of the BR information regions in each of the uplink subframes having the BR information regions.

The Slot field indicates the number of BR information regions (slots) in each of the uplink subframes having the BR information regions. In FIG. 5, the Slot field is set to 3 in the SFH of the xth superframe and thus each of the first and second uplink subframes has three BR information regions. An MS transmits BR information in one BR information region (slot).

The Mapping rule field specifies a mapping rule between BR codes and BR information regions.

Figure 6:
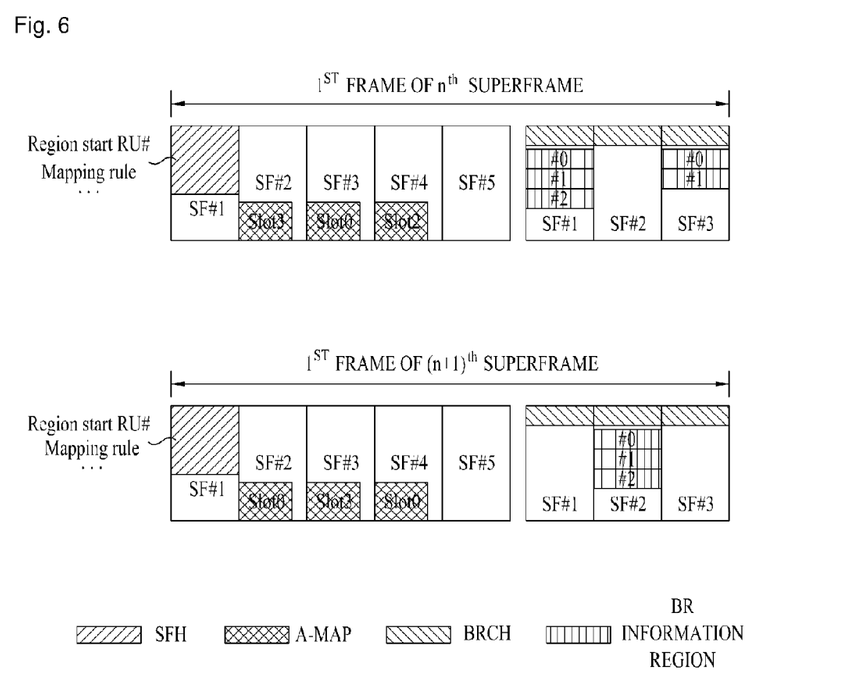
FIG. 6 illustrates frame structures in the case where BR information transmission-related information is transmitted in an SFH and Advanced-MAPs (A-MAPs).

FIG. 6 illustrates frame structures in the case where the BR information transmission-related information is transmitted in an SFH and A-MAPs.

Referring to FIG. 6, a Region field and a Mapping rule field are transmitted in an SFH and Slot fields are transmitted in A-MAPs. Due to transmission of a Slot field in an A-MAP of each subframe, a Location field is not necessary.

The BR information transmission-related information may be classified as additional information and delivered on another channel. Depending on a system information group to which the BR information transmission-related information belongs, a change interval is determined for the BR information transmission-related information. If the BR information transmission-related information belongs to a system information group transmitted in every superframe, the BR information transmission-related information may be changed every superframe. If the BR information transmission-related information belongs to a system information group transmitted in every n superframes, the BR information transmission-related information may be changed every n superframes.

In FIG. 6, the change intervals of the Region field and the Mapping rule field are n superframes (n>=1) and the change interval of the Slot fields is n subframes (n>=1). Accordingly, the number of BR information regions may be adjusted according to an uplink load, more flexibly than in the case of transmitting a Slot field in an SFH.

Referring to FIG. 4 again, the MS transmits BR information in a BR information region to the BS according to the BR information transmission-related information in step S420. A BR code may be transmitted in a control resource area of a subframe carrying the BR information.

When attempting a random access to the BS, the MS selects one of preset codes and transmits the selected code to the BS, for contention-based random access. The transmitted code is called a BR code. The term "BR code" may be replaced with, but not limited to, bit stream, signature, random access preamble, or access sequence depending on a wireless communication system. The BR code may be, but not limited to, an orthogonal code such as a Hadamard code, or a Constant Amplitude Zero Auto Correlation (CAZAC) sequence.

BR code information is information that the MS transmits to the BS to request resource allocation. The conventional BW-REQ message includes a BR size, the status of waiting traffic, QoS information, etc. The BR information may include additional information as well as the whole or part of the information included in the conventional BW-REQ message. Specifically, the BR information may include QoS information such as a QoS level, a QoS index, a QoS ID, and a flow ID, an MS ID (or a station ID), and a BR size.

The MS ID identifies the MS that transmits the BR information and the BR size is the size of resources that the MS requests to the BS in order to transmit uplink data. The flow ID is the index of a connection by which the MS transmits user data or control data.

The QoS level, the QoS index and the QoS ID are the QoS requirement of the MS. The QoS level, the QoS index and the QoS ID are determined based on many QoS parameters such as a grant scheduling type or the priority level of the MS.

To efficiently request uplink resources and allocate uplink resources accordingly in a wireless communication system, application services are classified into five grant scheduling types, Unsolicited Grant Service (UGS), real-time Polling Service (rtPS), extended-real-time Polling Service (ertPS), non-real-time Polling Service (nrtPS), and Best Effort (BE). Scheduling types may be classified into real-time service and non-real-time service, or into delay-sensitive service and delay-tolerant service. Thus, a scheduling type may be signaled to indicate a service classified according to this classification.

Figure 7:
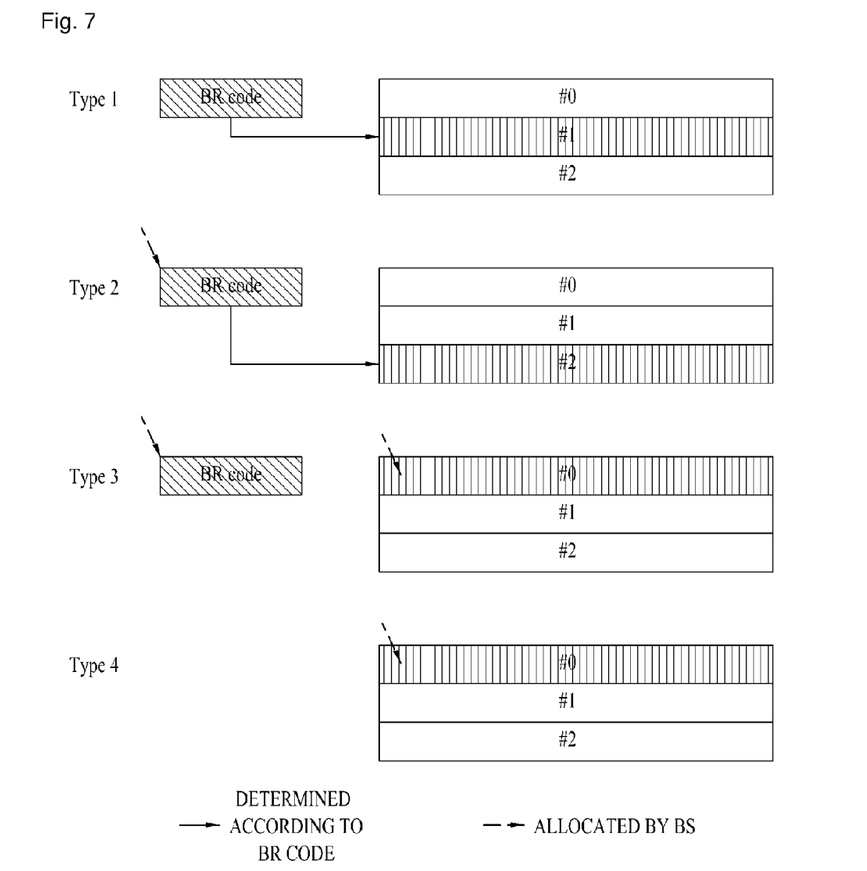
FIG. 7 illustrates four types of determining BR information regions according to embodiments of the present invention.

Now, methods for determining a BR information region in which an MS will transmit BR information will be described. According to embodiments of the present invention, four types are defined to determine BR information regions.

FIG. 7 illustrates four types of determining BR information regions according to embodiments of the present invention.

Referring to FIG. 7, a first type (Type 1) is intended for a contention-based procedure, whereas second third and fourth types (Type 2, Type 3 and Type 4) are designed for a non-contention-based procedure. In Type 1, the MS selects one of preset codes randomly and transmits the selected code to the BS. On the other hand, the MS transmits to the BS a BR code allocated by the BS in Type 2 and Type 3.

Characteristically, the BS notifies the MS of a BR information region to be used as well as a BR code in Type 3.

In Type 4, the BS allocates a BR information region to the MS without allocating a BR code.

Allocation of a BR code and/or a BR information region may be signaled by broadcasting or unicasting. An example of broadcasting is A-MAP transmission. An A-MAP is masked with a broadcasting MS ID and an MS to which a BR code and/or a BR information region has been allocated may be identified from allocation information included in the A-MAP. A MAC message is an example of unicasting. The BS may transmit information about a BR code and/or a BR information region only to a specific MS by a MAC message. The MAC message may be any of ranging-related messages, flow creation/modification-related messages, etc.

A BR information region is determined according to a BR code that the MS will transmit to the BS in Type 2. For instance, a BR information region in which the MS will transmit BR information is determined according to a mapping rule between BR codes and BR information regions. The mapping rule may be designed so that a BR information region is determined using the index of a BR code or part of the index of the BR code.

For example, on the assumption that there are four BR information regions and the mapping rule is that the BR information regions are mapped to BR codes according to the remainders of dividing the indexes of the BR codes by the total number of BR information regions, 4, if the MS uses a BR code with index 4 or 8, it transmits BR information in BR information region #0.

In Type 1, a BR information region in which the MS will transmit BR information is determined according to a BR code that the MS will transmit to the BS. For example, the MS determines a BR information region by applying a BR code-BR information region mapping rule to a BR code to be transmitted to the BS. If the determined BR information region is not occupied by an MS of Type 2 or Type 4, the MS uses the BR information region. On the other hand, if the determined BR information region is occupied by an MS of Type 2 or Type 4, the MS uses the BR information region previous to or next to the BR information region.

The MS may be aware of BR information regions occupied by MSs of Type 2 or Type 4 by receiving information about BR codes or BR information regions that the BS transmits to the MSs of Type 2 or Type 4.

Figure 8:
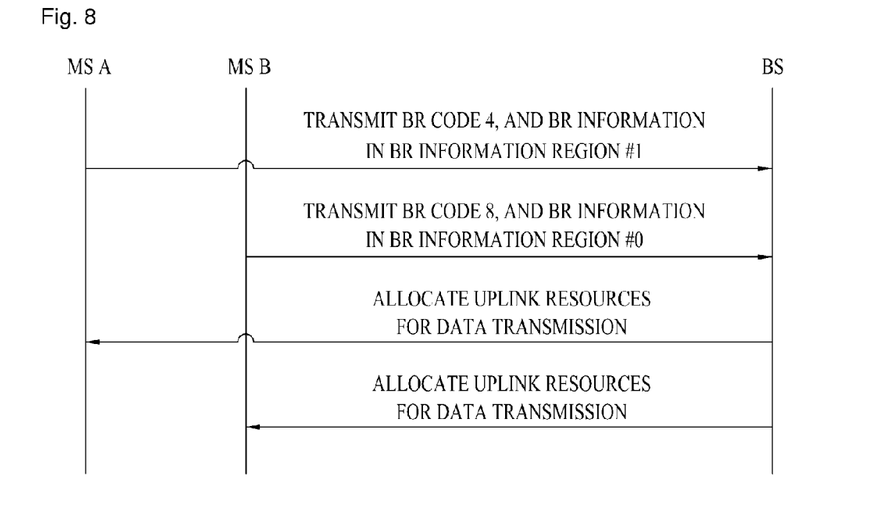
FIG. 8 is a diagram illustrating a signal flow for an operation for transmitting BR information by an MS of a first type (Type 1), MS A and an MS of a second type (Type 2), MS B.

FIG. 8 is a diagram illustrating a signal flow for an operation for transmitting BR information by an MS of Type 1, MS A and an MS of Type 2, MS B.

Referring to FIG. 8, MS A transmits a BR code with index 4 (BR code 4) and BR information, and MS B transmits a BR code with index 8 (BR code 8) and BR information. Assuming that a mapping rule is to determine a BR information region based on the remainder of dividing the index of a BR code by 4, a BR information region for MS A is #0 because of the index of the BR code 4 for MS A. However, BR information region #0 is occupied by MS B and thus MS A transmits its BR information in the BR information region following BR information region #0, that is, BR information region #1. Meanwhile, MS B transmits its BR information in BR information region #0 because MS B uses BR code 8. Then the BS allocates uplink resources for uplink data transmission to MS A and MS B.

In Type 2, a BR information region in which to transmit BR information is determined according to a BR code allocated by the BS. In Type 3 and Type 4, the BS allocates a BR information region to an MS. Thus the BS may allow a specific MS to occupy a specific BR information region at a specific time.

To be more specific, the BS allocates a BR code to a particular MS in such a manner that a BR region in which the MS will transmit BR information is not identical to BR information regions to be used by other MSs. In Type 3 and Type 4, the BS allocates a BR information region to a particular MS in such a manner that the BR information region is not identical to BR information regions to be used by other MSs.

To this end, a BR code or a BR information region other than BR codes or BR information regions available to unspecified MSs may be allocated to a particular MS. In this method, the unspecified MSs do not have knowledge of the BR code or BR information region allocated to the particular MS.

Alternatively or additionally, BR codes or BR information regions for unspecified MSs are distinguished from BR codes or BR information regions for particular MSs and information about the classification is transmitted to the MSs. For example, if three of six slots in total are used for unspecific MSs and the other three slots are used for particular MSs, information about the classification is transmitted to the MSs. According to these methods, the unspecified MSs do not need to know the BR codes or BR information regions allocated to the particular MSs.

Figure 9:
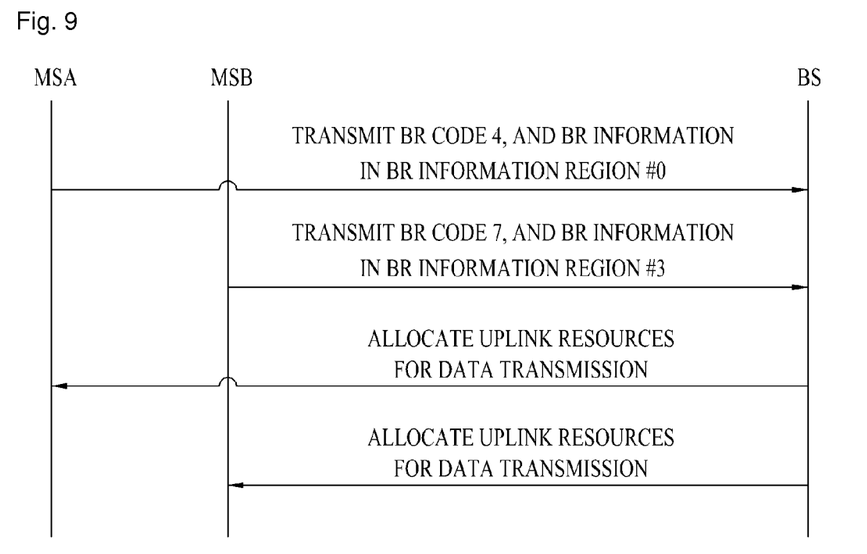
FIG. 9 is a diagram illustrating a signal flow for an operation for transmitting BR information by MSs, when BR information regions are determined according to Type 2.
Figure 10:
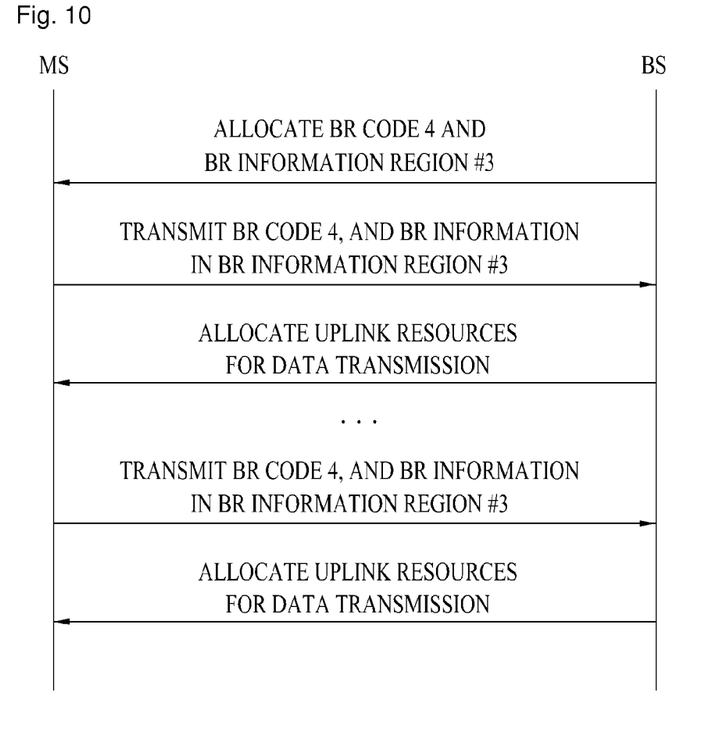
FIG. 10 is a diagram illustrating a signal flow for an operation for transmitting BR information by an MS, when a BR information region is determined according to a third type (Type 3).
Figure 11:
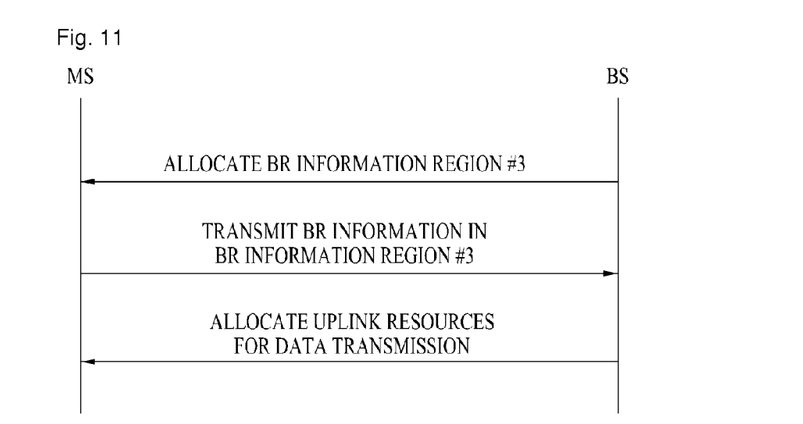
FIG. 11 is a diagram illustrating a signal flow for an operation for transmitting BR information by an MS, when a BR information region is determined according to a fourth type (Type 4).

FIG. 9 is a diagram illustrating a signal flow for an operation for transmitting BR information by MSs, when BR information regions are determined according to Type 2, FIG. 10 is a diagram illustrating a signal flow for an operation for transmitting BR information by an MS, when a BR information region is determined according to Type 3, and FIG. 11 is a diagram illustrating a signal flow for an operation for transmitting BR information by an MS, when a BR information region is determined according to Type 4.

Referring to FIG. 9, MS A transmits a BR code with index 4 (BR code 4) and BR information, and MS B transmits a BR code with index 7 (BR code 7) and BR information. Assuming that a mapping rule is to determine a BR information region based on the remainder of dividing the index of a BR code by 4, a BR information region for MS A is #0 because of the index of the BR code 4 for MS A. Due to the index of the BR code 7, MS B transmits BR information in BR information region #3. Then the BS allocates uplink resources for uplink data transmission to MS A and MS B.

Referring to FIG. 10, a BS allocates BR code 4 and BR information region #3 to an MS. Thus the MS transmits BR code 4, and BR request information in BR information region #3 to the BS. Then the BS allocates uplink resources for uplink data transmission to the MS.

Referring to FIG. 11, the BS allocates BR information region #3 to the MS. The MS transmits BR information in BR information region #3 to the BS. Then the BS allocates uplink resources for uplink data transmission to the MS.

When the BS allocates a BR code or BR information region to the MS in Type 2 or Type 4, it may negotiate a transmission time of BR information with the MS. The transmission time of BR information is specified by the position and cycle of BR information.

Figure 12:
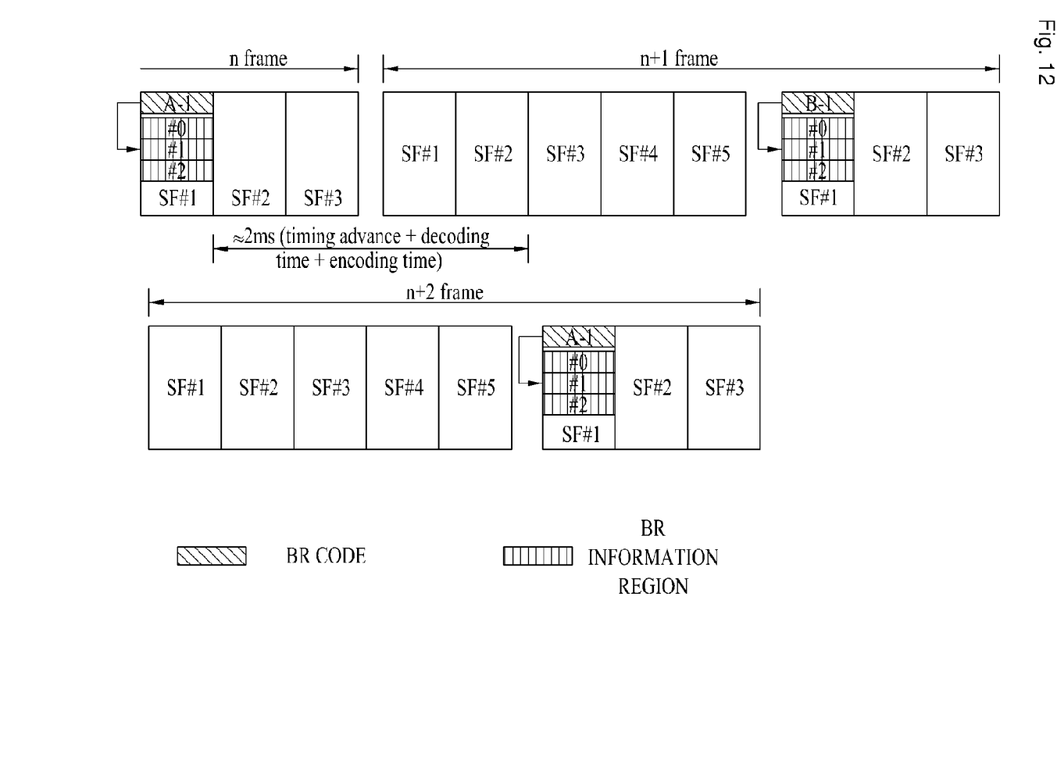
FIG. 12 illustrates an operation for transmitting BR codes and BR information at time points negotiated between two MSs and a Base Station (BS).

FIG. 12 illustrates an operation for transmitting a BR code and BR information at time points negotiated between two MSs and a BS.

Referring to FIG. 12, MS A and MS B each transmit a BR code and BR information in the first uplink subframe of every second frame. As different MSs share the same resources, the efficiency of uplink resources can be increased.

In Type 1, an MS randomly selects a BR code and transmits the BR code. Therefore, it is difficult for the BS to allocate a specific BR information region dedicatedly to the specific MS at a specific time. That is, even though two MSs select different BR codes, they may transmit BR information in the same BR information region.

Figure 13:
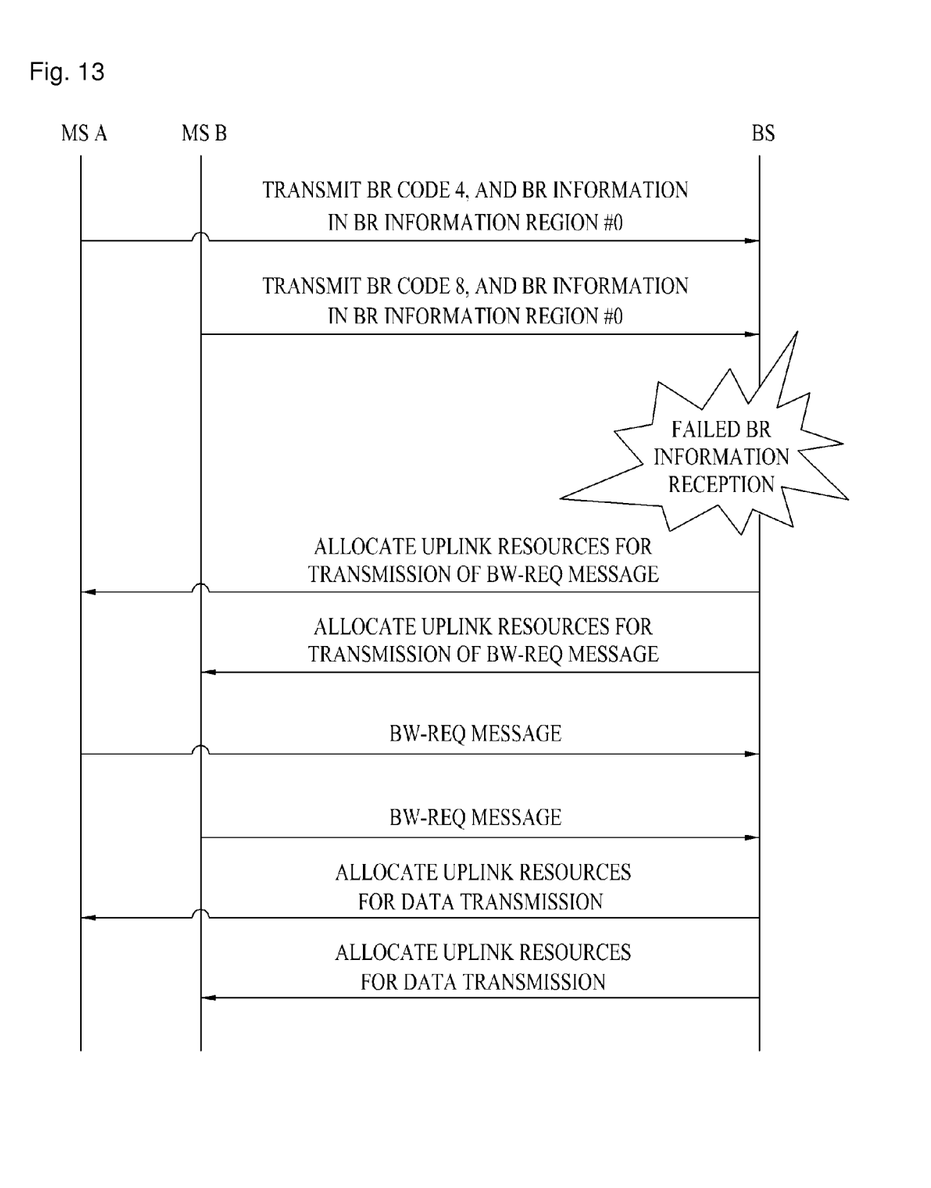
FIG. 13 is a diagram illustrating a signal flow for an operation for transmitting BR information by two MSs when BR information regions are determined according to Type 1.

FIG. 13 is a diagram illustrating a signal flow for an operation for transmitting BR information by two MSs, when BR information regions are determined according to Type 1.

Referring to FIG. 13, MS A transmits a BR code with index 4 (BR code 4) and BR information, and MS B transmits a BR code with index 8 (BR code 8) and BR information. Assuming that a mapping rule is to determine a BR information region based on the remainder of dividing the index of a BR code by 4, MS A and MS B transmit their BR information in BR information region #0 because of the indexes of their BR codes, 4 and 8. Since MS A and MS B share the same BR information region, the BR information transmitted by MS A and MS B is damaged. When the BS is aware of BR codes 4 and 8, it may know that MS A and MS B use the same BR information region even though it does not decode the BR information region. Hence, the BS allocates uplink resources for transmission of BW-REQ messages to MS A and MS B.

Thus MS A and MS B transmit their BW-REQ messages to the BS and the BS allocates uplink resources for uplink data transmission to MS A and MS B.

Referring to FIG. 4 again, if the BR code has been transmitted successfully but the BR information is failed in step S430, the MS is allocated uplink resources for transmission of a BW-REQ message in step S440. The MS transmits the BW-REQ message in the allocated uplink resources in step S450, is allocated uplink resources for data transmission by the BS in step S460, and transmits data in the allocated uplink resources in step S470.

If the BR information transmission is successful in step S430, the MS is allocated uplink resources for data transmission by the BS in step S460, and transmits data in the allocated uplink resources in step S470.

Figure 14:
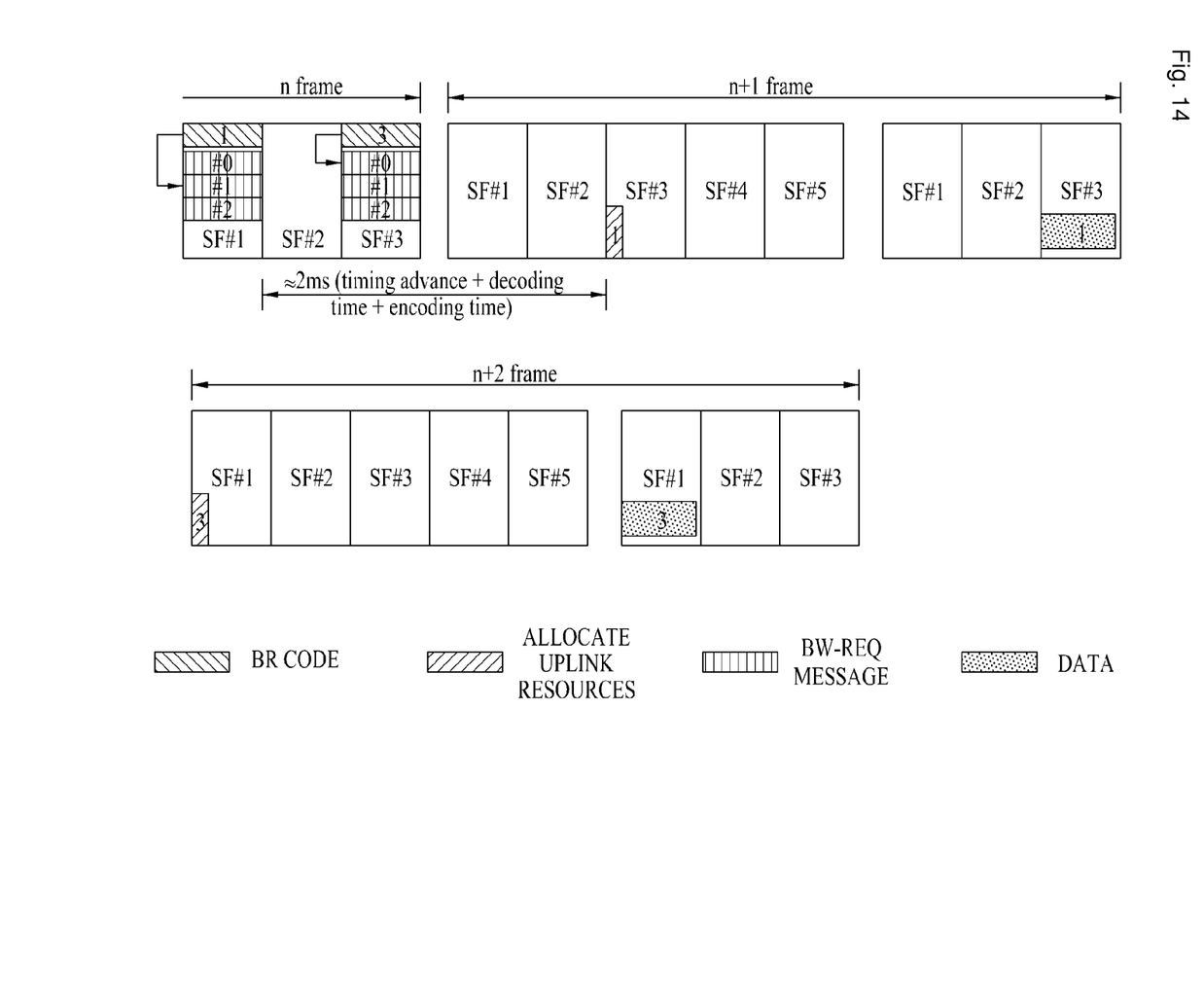
FIG. 14 is a diagram illustrating transmission timings of signaling and messages, in the case where BR information is successfully transmitted in the BR information transmission method according to the embodiment of the present invention.

FIG. 14 is a diagram illustrating transmission timings of signaling and messages, in the case where BR information is successfully transmitted in the BR information transmission method according to the embodiment of the present invention.

Referring to FIG. 14, reference numeral 1 denotes transmission timings of signaling and messages when BR information is transmitted in a first uplink subframe, and reference numeral 3 denotes transmission timings of signaling and messages when BR information is transmitted in a third uplink subframe.

As illustrated in FIG. 14, the time taken for transmitting uplink data after transmitting a BR code is two frames.

Upon receipt of a message, signaling or trigger signal that requests discontinuation of using a current BR information region from the BS, the MS does not use the current BR information region any longer.

In Type 2 and Type 3, upon receipt of a BR code deallocation message from the BS, the MS returns the allocated BR code to the BS and does not use the allocated BR information region. However, when the MS transitions from Type 3 to Type 4, the MS is allowed to continue using the allocated BR information region although it returns its BR code to the BS.

In Type 2, Type 3 and Type 4, the BS may request BR information region deal-location to the MS by a unicast message. The BS may request the MS to discontinue using a current BR information region by piggyback a data message or a control message with the BR information region deallocation request, or by a stand-alone MAC message.

In any of Type 1 to Type 4, the BS may request the MS to discontinue using the current BR information region by a broadcast message. Specifically, the BS transmits IDs of BR information regions to be deallocated in the form of values or a bitmap to MSs. For instance, if allocation information transmitted by the BS, i.e. Location and Slot fields are set to 0s, the MSs determine that their current BR information regions are not available any longer. The BS may transmit a message indicating that all BR information regions are unavailable. If there is a BR code allocated by the BS in Type 2 or Type 3, the MS may continue using the allocated BR code. Upon receipt of a broadcast message requesting discontinuation of using a current BR information region, an MS of Type 1 or Type 2 transmits only a BR code without transmitting BR information. When an MS of Type 3 receives a broadcast message requesting discontinuation of using a current BR information region, it automatically transitions to Type 2 or transmits only the BR code. When an MS of Type 4 receives a broadcast message requesting discontinuation of using a current BR information region, it automatically transitions to Type 1 or transmits only the BR code.

The present invention is applicable to an 802.16m MS that enters an L-Zone designed to support an 802.16e MS. An MS ID, QoS ID or flow ID may be replaced with a connection ID in information transmitted in a BR information region. The present invention is also applicable to an MS in a femtocell and an allowed MS in a Closed Subscriber Group (CSG)-open femtocell accessible to both allowed and non-allowed MSs.

Figure 15:
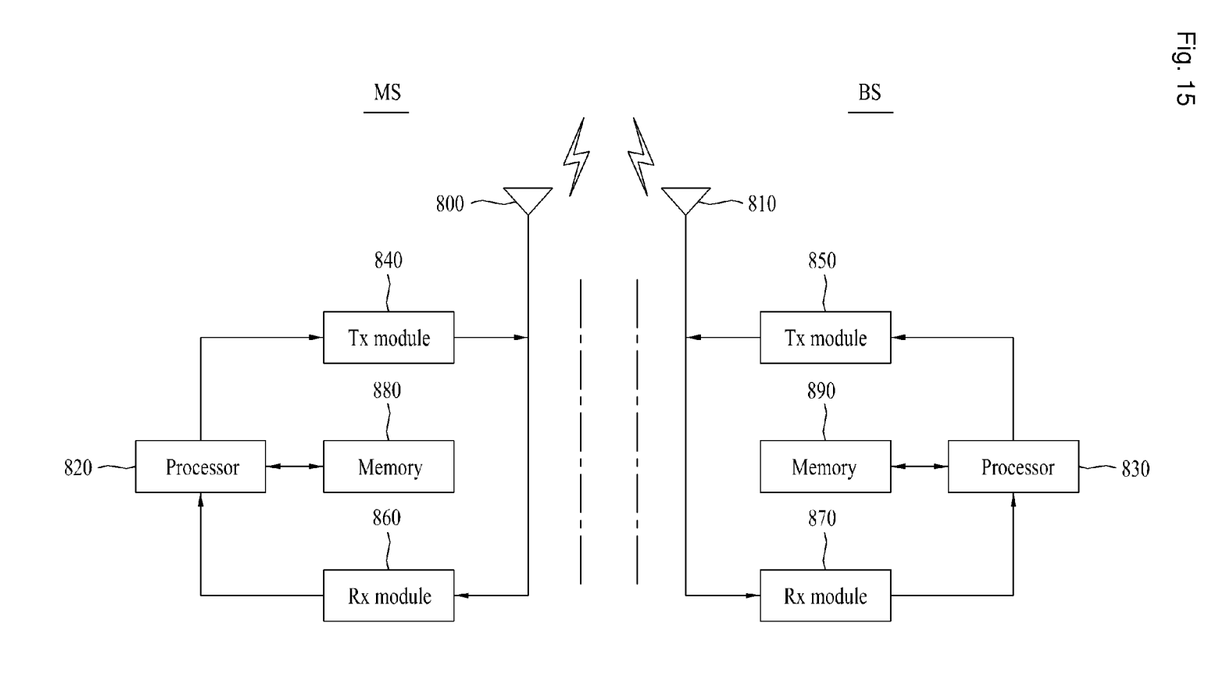
FIG. 15 is a block diagram of an MS and a BS for implementing the above embodiments of the present invention, according to an embodiment of the present invention.

FIG. 15 is a block diagram of an MS (or Advanced MS (AMS)) and a BS (or Advanced BS (ABS)) for implementing the embodiments of the present invention, according to an embodiment of the present invention.

Referring to FIG. 15, each of the MS and the BS includes an antenna 800 or 810 for transmitting and receiving information, data, signals and/or messages, a Transmission (Tx) module 840 or 850 for transmitting a messages by controlling the antenna 800 or 810, a Reception (RX) module 860 or 870 for receiving a message by controlling the antenna 800 or 810, a memory 880 or 890 for storing information related to communication between the MS and the BS, and a processor 820 or 830 for controlling the Tx module 840 or 850, the Rx module 860 or 870, and the memory 880 or 890. The BS may be a femto BS or a macro BS.

The antennas 800 and 810 externally transmit signals generated from the TX modules 840 and 850 or output received external Radio Frequency (RF) signals to the RX modules 860 and 870. When Multiple Input Multiple Output (MIMO) is supported, two or more antennas may be used.

The processors 820 and 830 provide overall control to the MS and the BS. Particularly, the processors 820 and 830 may perform a control function for implementing the embodiments of the present invention, a variable MAC frame control function based on service characteristics and a propagation environment, a handover function, and an authentication and encryption function. Each of the processors 820 and 830 may further include an encryption module for encrypting various messages and a timer for controlling transmission and reception of various messages.

The Tx modules 840 and 850 may encode and modulate transmission signals and/or data scheduled by the processors 820 and 830 in a predetermined coding and modulation scheme and outputs the modulated signals and/or data to the antennas 800 and 810.

The Rx modules 860 and 870 may recover the original data by decoding and modulating RF signals received through the antennas 800 and 810 and thus may provide the original data to the processors 820 and 830.

The memories 880 and 890 may store programs for processing and control operations of the processors 820 and 830 and temporarily store input/output data. For example, the memory 880 of the MS may temporarily store an uplink grant, system information, a Station ID (STID), a Flow ID (FID), action time information, resource allocation information, and frame offset information, which are received from the BS.

Also, each of the memories 880 and 890 may include at least one of a flash memory-type storage medium, a hard disc-type storage medium, a multimedia card micro-type storage medium, a card-type memory (e.g. an Secure Digital (SD) or extreme Digital (XS) memory), a Random Access Memory (RAM), a Read-Only Memory (ROM), an Electrically Erasable Programmable Read-Only Memory, a Programmable Read-Only Memory, a magnetic memory, a magnetic disc, and optical disk.

MODE FOR THE INVENTION

Various embodiments have been described in the best mode for carrying out the invention.

INDUSTRIAL APPLICABILITY

The present invention provides is applicable to a wireless communication system. More particularly, the present invention is applicable to a method for allocating resources for transmission of BR information and a method for transmitting the BR information in a wireless communication system.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods for transmitting BR information in a wireless communication system according to the embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

It is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A method for transmitting Bandwidth Request (BR) information in a Mobile Station (MS) in a multi-carrier wireless communication system, the method comprising:
    transmitting a BR code in a first region of a subframe to a Base Station (BS) to attempt a random access, wherein the BR code includes an index corresponding to an integer equal to or greater than zero (0); and
    transmitting the BR information in a second region of the subframe to the BS to request resource allocation, wherein the BR information includes an MS identifier, a resource size and QoS (Quality of Service) information,
    wherein each of N regions for transmission of the BR information has an index from zero (0) to N−1 and the second region is determined for transmission of the BR information based on an index that corresponds to a remainder from dividing the index of the BR code by N.

2. The method according to claim 1, wherein the BR code is selected by the MS from among a plurality of predetermined codes.

3. The method according to claim 1, wherein the BR code is allocated to the MS by the BS such that a region for transmission of BR information by other MSs does not overlap the second region.

4. The method according to claim 1, further comprising receiving, from the BS, information related to transmission of the BR information.

5. A method for allocating resources for transmission of Bandwidth Request (BR) information in a Base Station (BS) in a multi-carrier wireless communication system, the method comprising:
    receiving a BR code for a random access in a first region of a subframe from a Mobile Station (MS), wherein the BR code includes an index corresponding to an integer equal to or greater than zero (0);
    receiving BR information that requests resource allocation in a second region of the subframe from the MS, wherein the BR information includes an MS identifier, a resource size and QoS (Quality of Service) information; and
    allocating uplink resources for data transmission to the MS,
    wherein each of N regions for transmission of the BR information has an index from zero (0) to N−1 and the second region is determined based on an index that corresponds to a remainder from dividing the index of the BR code by N.

6. The method according to claim 5, wherein the BR code is selected by the MS from among a plurality of predetermined codes.

7. The method according to claim 5, wherein the BR code is allocated to the MS by the BS such that a region for transmission of BR information by other MSs does not overlap the second region.

8. The method according to claim 5, further comprising:
    allocating uplink resources for transmission of a bandwidth request message to the MS when the received BR information is erroneous; and
    receiving the bandwidth request message from the MS using the allocated uplink resources.

* * * * *